March 24, 1959 W. BOYCHICK 2,879,008
REWIND CRANK FOR CAMERAS
Filed Jan. 27, 1955
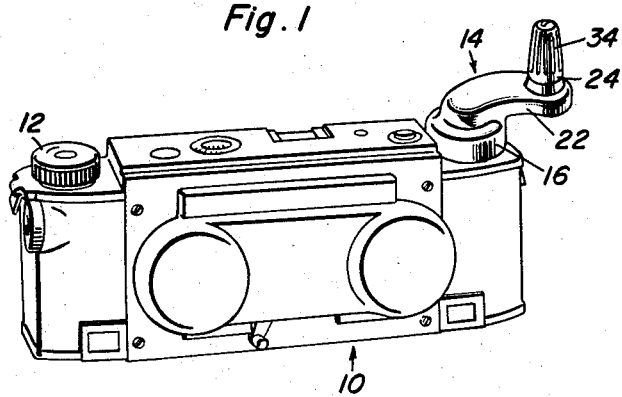
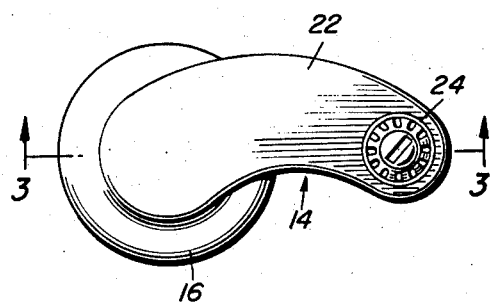
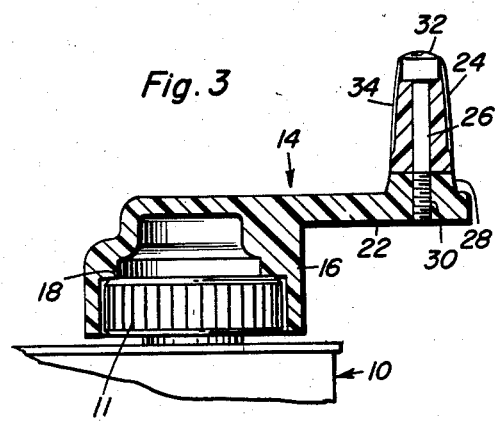
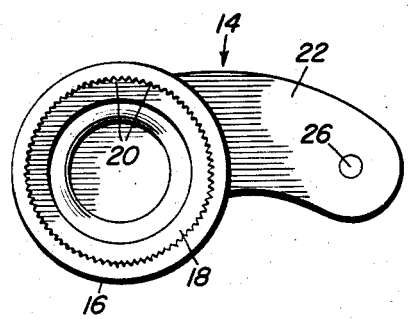
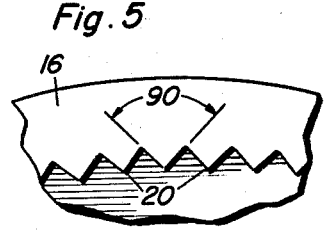
Walter Boychick
INVENTOR.
BY *Clarence A. O'Brien*
and *Harvey B. Jacobson*
Attorneys

United States Patent Office 2,879,008
Patented Mar. 24, 1959

2,879,008
REWIND CRANK FOR CAMERAS

Walter Boychick, Newark, N.J.

Application January 27, 1955, Serial No. 484,351

1 Claim. (Cl. 242—71.3)

This invention relates to new and useful improvements in photographic equipment, and more specifically to a winding crank for use in conjunction with winding knobs of cameras.

The average camera is provided with relatively small knobs which must be turned between one's thumb and forefinger. Inasmuch as film is normally so arranged whereby it is necessary for one to turn the knob a relatively large number of times in order to first start the film through the camera and also to position the film, it will be readily apparent that the provision of the small knobs renders an inconvenience to the user of the camera. However, in order to make the camera as small as possible and to prevent the cameras from having projecting parts, the knobs necessarily are of a reduced size.

It is therefore the primary object of this invention to provide an improved winding crank for cameras, the crank being so constructed whereby it may be quickly and easily positioned over a knob and attached thereto so that when the crank is turned, the knob will be turned likewise.

Another object of this invention is to provide an improved crank for cameras, the crank being so constructed whereby it may engage over knobs of cameras in which the knobs are of different design, but of the same general circumference, the crank being so constructed whereby it will firmly grip such knobs for turning the same.

A further object of this invention is to provide an improved crank for cameras, the crank including a sleeve portion having a plurality of circumferentially spaced, inwardly projecting teeth, the teeth being so arranged whereby they will conveniently mesh with serrations in the periphery of knobs of cameras so as to form an interlock with such knobs and permit the knobs to be conveniently rotated due to the relatively long length of the crank arm of the crank.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a conventional type of camera and shows mounted on the rewind knob thereof the rewind crank which is the subject of this invention, the rewind knob being completely encased within the sleeve portion of the rewind crank and not being shown;

Figure 2 is an enlarged plan view of the rewind crank of Figure 1 and shows the general details thereof;

Figure 3 is an enlarged vertical sectional view taken substantially upon the plane indicated by the section line 3—3 of Figure 2 and shows the specific construction of the rewind crank including the details of both the sleeve portion and the knob thereof, the rewind crank being shown mounted on the rewind knob;

Figure 4 is an enlarged bottom plan view of the rewind crank of Figures 1 and 2 and shows the arrangement of teeth within the sleeve portion thereof for engagement with a camera knob; and Figure 5 is an enlarged fragmentary bottom plan view of the sleeve portion of the sleeve portion of the rewind crank and shows the specific details of the teeth.

Referring now to the drawings in detail, it will be seen that there is illustrated a conventional type of camera which is referred to in general by the reference numeral 10. The camera 10 includes a rewind knob 11 and a winding knob 12. The winding knob 12 is identical with the rewind knob 11 and differs therefrom only in the relationship thereof with respect to the camera. Mounted on the rewind knob 11 and completely encasing the same is the rewind crank which is the subject of this invention, the crank being referred to in general by the reference numeral 14.

As is best illustrated in Figures 3 and 4, the rewind crank 14 includes a sleeve portion 16. The sleeve portion 16 has a shoulder 18 formed in the rear part thereof to limit the engagement of the sleeve portion 16 over one of the knobs of the camera 10. Formed in the outer part of the sleeve portion 16 is a plurality of relatively minute, circumferentially spaced teeth 20. The teeth 20 are elongated and disposed in parallel relation with the axis of the sleeve portion 16.

As is best illustrated in Figure 5, the teeth 20 are more in the form of serrations and are disposed closely adjacent each other. It will be readily apparent from the view that the teeth 20 are of a right-angled cross-section so as to provide definite points which will dig in between serrations which are formed on knobs, such as the rewind knob and the wind knob 12 of the camera 10.

Formed integrally with the rear part of the sleeve portion 16 is an arcuate in plan crank arm 22. The crank arm 22 is of a generally rectangular cross-section and is provided at its outer end with a knob 24. The knob 24 is secured to the crank arm 22 by a fastener 26. The outer end portion of the crank arm 22 is in the form of an enlarged boss 28 which is provided with an internally threaded bore 30. The fastener 26 has one end thereof threadedly engaged in the bore 30 and is provided at its opposite end with a head 32.

The knob 24 is rotatably carried by the fastener 26 and is provided with circumferentially spaced serrations or fluting 34 to facilitate the gripping thereof. The knob 24 is retained on the fastener 26 by an enlarged head 32 of the fastener 26 which is countersunk within the end of the knob 34.

It is to be understood that many cameras, particularly the camera of the type to which the camera 10 belongs, are provided with film which comes in cartridges. The film is fed through the back portion of the camera and is started on the shaft to which the wind knob 12 is connected. The wind knob 12 is first turned to align the film with the lens of the camera and then is selectively wound to move the different sections of the film in alignment with the lens so as to take numerous pictures. After the film has been completely reeled out of its cartridge or casing, it is necessary that the rewind knob 11 of the camera be rotated in order to completely wind the film back into the cartridge. As pointed out in the objects of the invention, the knobs of a camera are relatively small and it is an awkward job to turn them. Inasmuch as a large amount of film must be rewound into the cartridge at one time, it will be seen that this is a tiresome task.

By slipping the sleeve portion 16 of the rewind crank over the rewind knob of the camera, it will be readily apparent that an interlock will be caused between the sleeve portion 16 and the rewind knob 11 due to the provision of the teeth 20. Then, by turning the rewind crank 20 with ease, the film may be rewound into its cartridge.

While the rewind crank 14 has been specifically illustrated in relation with the rewind knob 11 of the camera 10 and specifically designated as a rewind crank, it is to be understood that its use is in no way intended to be so limited. The knobs on a camera are normally of the same size so as to be interchangeable and accordingly, the rewind crank 14 may be equally as well associated with the wind knob 12 so that the film in the camera may be conveniently positioned with little or no effort.

It is pointed out at this time that the rewind crank 14 is of a relatively small size and may be easily carried in one's gadget bag. Further, if desired, it is of such a small size that it may be conveniently carried in one's pocket.

The foregoing is considered as illustrative only of the principles of the invention. Further, since numerous modifications and changes will readily occur to those skilled in the art, it is not desired to limit the invention to the exact construction and operation as shown and described, and accordingly, all suitable modifications and equivalents may be resorted to, falling within the scope of the appended claim.

What is claimed as new is as follows:

In combination with a camera of the type including a case having a recessed end portion, a rewind knob carried by said end portion within the general confines of said case, said rewind knob having a longitudinally scored periphery and a flat end, a rewind crank comprising a sleeve portion having an open and reduced closed end, the inner surface of said sleeve portion having inwardly projecting, longitudinally extending, circumferentially spaced teeth engaging said scored periphery, said closed end including a shoulder at the inner ends of said teeth, said shoulder engaging said flat end and retaining said sleeve portion out of engagement with the remainder of said camera, a crank arm extending from said closed end, said crank arm being disposed normal to the axis of said sleeve portion, said crank arm being disposed without the general confines of said case to permit 360 degree rotation.

References Cited in the file of this patent

UNITED STATES PATENTS

| | | |
|---|---|---|
| 434,050 | Remington | Aug. 12, 1890 |
| 783,210 | Lewis | Feb. 21, 1905 |
| 1,559,400 | Bagley et al. | Oct. 27, 1925 |
| 1,957,426 | Bouveng | May 8, 1934 |

FOREIGN PATENTS

| | | |
|---|---|---|
| 284,478 | Germany | May 28, 1915 |